United States Patent
Suzuki (10) Patent No.: US 10,578,994 B2
(45) Date of Patent: Mar. 3, 2020

(54) IMAGE FORMING APPARATUS THAT DETERMINES A FIXING TEMPERATURE FOR A FIXING OPERATION BASED ON TONER AMOUNTS OF BLOCKS OF IMAGE DATA AND RELATED IMAGE FORMING METHOD AND STORAGE MEDIUM

(71) Applicant: CANON KABUSHIKI KAISHA, Tokyo (JP)

(72) Inventor: Katsunari Suzuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/209,452

(22) Filed: Dec. 4, 2018

(65) Prior Publication Data
US 2019/0179238 A1   Jun. 13, 2019

(30) Foreign Application Priority Data
Dec. 13, 2017   (JP) ................................. 2017-238806

(51) Int. Cl.
*G03G 15/10* (2006.01)
*G03G 15/00* (2006.01)
*G03G 15/20* (2006.01)
*H04N 1/00* (2006.01)

(52) U.S. Cl.
CPC ....... *G03G 15/105* (2013.01); *G03G 15/2039* (2013.01); *G03G 15/2053* (2013.01); *G03G 15/5041* (2013.01); *G03G 15/5045* (2013.01); *G03G 15/5087* (2013.01); *H04N 1/00* (2013.01); *G03G 15/556* (2013.01); *G03G 2215/00059* (2013.01)

(58) Field of Classification Search
CPC ............. G03G 15/105; G03G 15/2039; G03G 15/2053; G03G 15/5041; G03G 15/5045
See application file for complete search history.

(56) References Cited

U.S. PATENT DOCUMENTS

| 2012/0069358 A1* | 3/2012 | Nakajima | G03G 15/0126 |
| | | | 358/1.9 |
| 2013/0045021 A1* | 2/2013 | Yoshioka | G03G 15/2039 |
| | | | 399/69 |

FOREIGN PATENT DOCUMENTS

JP   2015-084054 A   4/2015

* cited by examiner

*Primary Examiner* — Sandra Brase
(74) *Attorney, Agent, or Firm* — Venable LLP (57) ABSTRACT

An image forming apparatus includes a processor that derives, for each of a plurality of blocks of image data, a value indicating a toner amount to be used in forming a toner image by referring to a density of every pixel, of a plurality of pixels included in each block of image data, shifts a window, and outputs the window before shifting and the window after shifting, the window before shifting and the window after shifting overlapping with each other, and determines a fixing temperature for a fixing operation based on an analysis result of a first toner amount in the window that is output by referring to the toner amount of each block included in the window before shifting, and an analysis result of a second toner amount in the window that is output by referring to the toner amount of each block included in the window after shifting.

8 Claims, 9 Drawing Sheets

IMAGE FORMING APPARATUS THAT DETERMINES A FIXING TEMPERATURE FOR A FIXING OPERATION BASED ON TONER AMOUNTS OF BLOCKS OF IMAGE DATA AND RELATED IMAGE FORMING METHOD AND STORAGE MEDIUM

This application claims the benefit of Japanese Patent Application No. 2017-238806 filed Dec. 13, 2017, which is hereby incorporated by reference herein in its entirety.

BACKGROUND OF THE INVENTION

Field of the Invention

The present invention relates to an image forming apparatus, such as an electrophotographic photocopier or printer, an image forming method, and a storage medium.

Description of the Related Art

Image forming apparatuses, such as electrophotographic photocopiers and printers, include an image forming unit that forms an image (toner image) on a printing sheet (printing medium) and a fixing unit (fixing device) that fixes the image formed on the printing sheet.

For such an image forming apparatus, there has been a demand to maintain a fixing temperature that allows a toner image to be certainly fixed to a printing medium while also lowering the power consumption. A technique that adjusts the fixing temperature in accordance with the toner application amount has been known as a way to meet this demand.

Japanese Patent Laid-Open No. 2015-84054 discloses a technique that calculates the toner application amount of each pixel of image data, finds, as a representative value, the smallest or average toner application amount from the calculated toner application amounts for each set of a predetermined number of pixels, and determines the fixing temperature for each printing page based on the largest of the representative values in the printing page.

SUMMARY OF THE INVENTION

The present invention provides a technique that properly controls the fixing temperature for each printing page by efficiently analyzing the image data.

According to one aspect, the present invention provides an image forming apparatus including a determination unit that determines toner application amounts based on image data, a memory device that stores a set of instructions, and at least one processor that executes the set of instructions to control a fixing temperature for fixing a toner image, formed from the image data, to a printing medium in accordance with information created for each printing page by analyzing the toner application amounts determined by the determination unit, and to fix the toner image to the printing medium at the controlled fixing temperature. The determination unit divides each of the printing pages of the image data into a plurality of meshes of a predetermined size, determines positions corresponding to the plurality of meshes obtained by the dividing, and counts the toner application amounts of pixels in each of the plurality of meshes based on a determination result of the determining of the positions and the image data.

Further features of the present invention will become apparent from the following description of exemplary embodiments with reference to the attached drawings.

DESCRIPTION OF THE EMBODIMENTS

In the technique described in Japanese Patent Laid-Open No. 2015-84054, the processing required to determine the fixing temperature is complicated. Thus, depending on the input image data, the fixing temperature corresponding to the toner application amount for each printing page cannot be determined before the fixing operation starts. There is a problem, however, that performing the fixing operation after determining the fixing temperature lowers the printing rate by the length of time taken to determine the fixing temperature while performing the fixing operation before determining the fixing temperature leads to poor fixing of the toner image. Also, one might consider reducing the number of representative values. Reducing the number of representative values, however, leads to a possibility that the accuracy of the fixing temperature control drops in accordance with this reduction of the number.

An embodiment of the present invention will be described below with reference to the drawings. Note that the constituent components described in this embodiment are mere examples, and are not intended to limit the scope of the present invention to those described. Moreover, not all the combinations of the constituent components described in the embodiment are necessarily essential for a solution to the problem.

Embodiment

System Configuration

Figure 1:
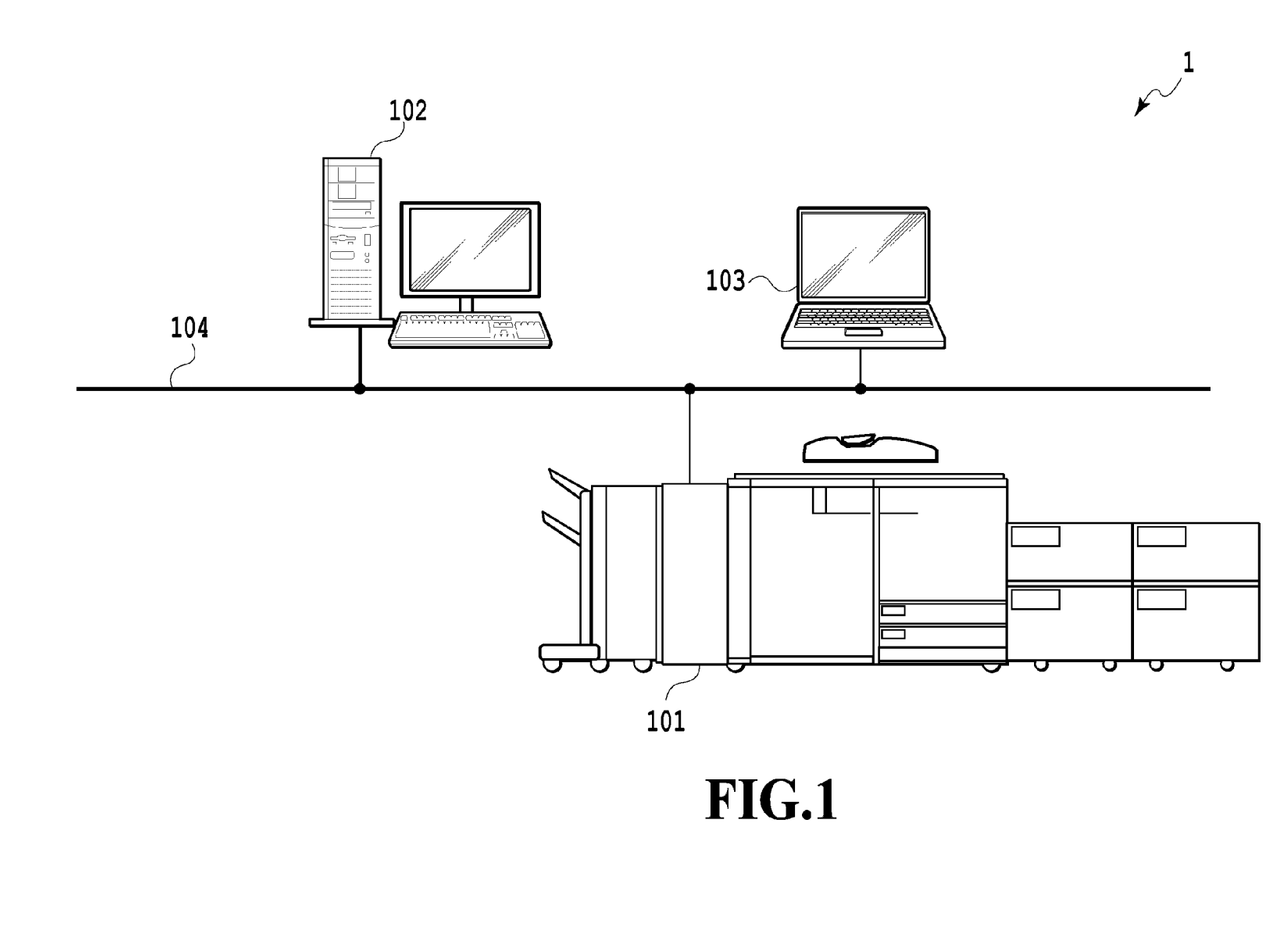
FIG. 1 is a diagram illustrating an example of the configuration of a system including an image forming apparatus.

FIG. 1 is a diagram illustrating an example of the configuration of an image forming system including an image forming apparatus according to an embodiment of the present invention. As illustrated in FIG. 1, an image forming system 1 includes an image forming apparatus 101, a print server 102, and a client personal computer (PC) 103. Also, those components are communicatively connected to each other by a network 104.

The image forming apparatus 101 processes various types of input data to form an image (image formation), and outputs a printed product. Specifically, the image forming apparatus 101 performs printing by using a photocopying function or a function of printing print data received from the print server 102 or the client PC 103. In a case in which printing is performed, the image forming apparatus 101 controls heaters 34 and 35 of a later-described fixing device 31, such that the heaters 34 and 35 will be at a fixing temperature suitable for the print data or print condition.

Description of Operation of Image Forming

Figure 2:
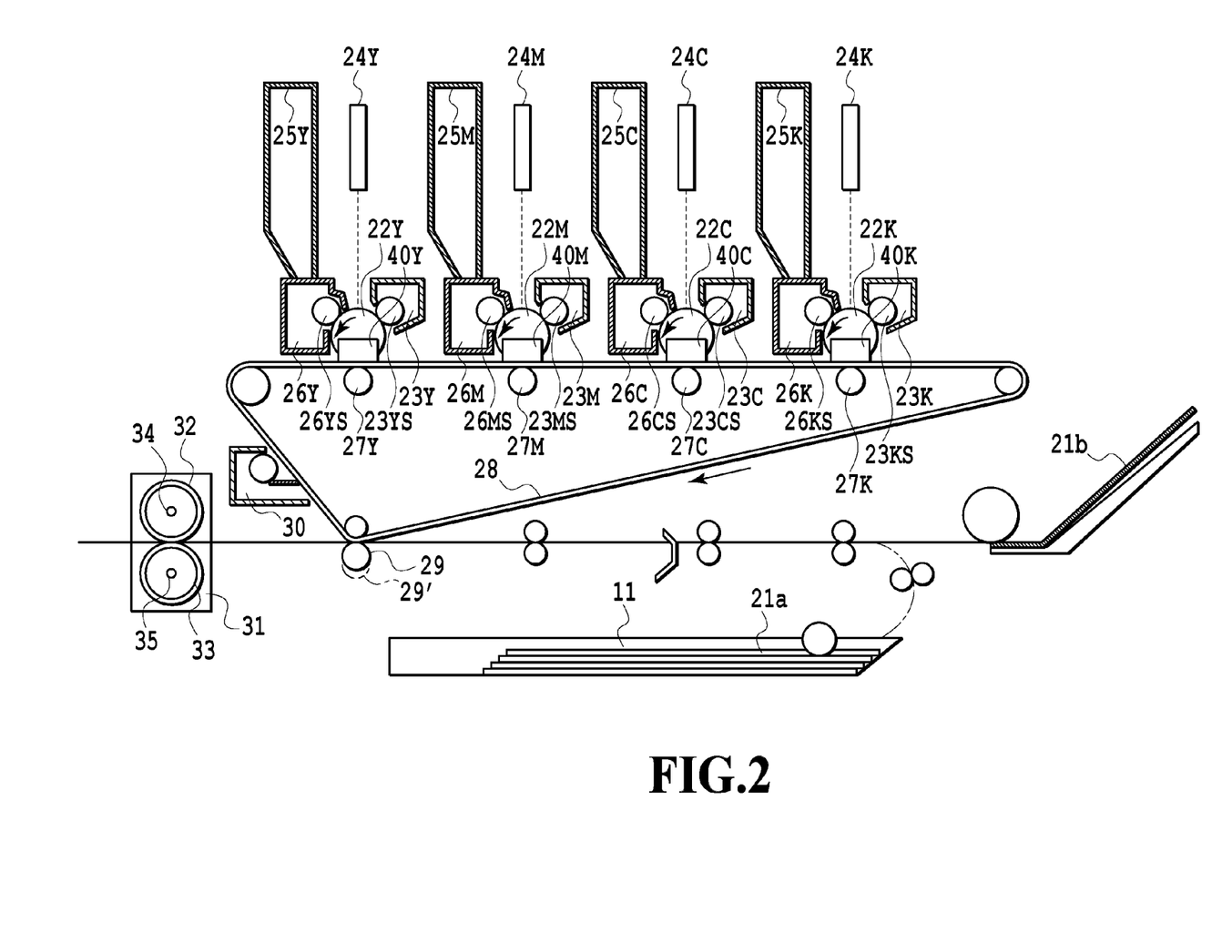
FIG. 2 is a diagram illustrating the configuration of an electrophotographic image forming apparatus.

Next, the image forming operation by the electrophotographic image forming apparatus 101 will be described with reference to FIG. 2. FIG. 2 is a diagram illustrating the configuration of a tandem-type color image forming apparatus using an intermediate transfer body as an example electrophotographic image forming apparatus.

The image forming apparatus illustrated in FIG. 2 includes four image forming units that form toner images by using yellow (Y), magenta (M), cyan (C), and black (K) toners, respectively. In the following, the image forming units with these toners will be referred to as a first station, a second station, a third station, and a fourth station, respectively.

The stations are disposed along the peripheral surface of the intermediate transfer body in the order of the first, second, third, and fourth stations from an upstream side to a downstream side in the direction of movement of the peripheral surface of the intermediate transfer member body. The image forming operation is done by charge, exposure, development, transfer, and fixing, in this order. Each of these operations will now be described.

Charge

First, photosensitive drums 22Y, 22M, 22C, and 22K are charged by injection chargers 23Y, 23M, 23C, and 23K, respectively. The injection chargers 23Y, 23M, 23C, and 23K are provided with sleeves 23YS, 23MS, 23CS, and 23KS, respectively. The photosensitive drums 22Y, 22M, 22C, and 22K are capable of rotating in response to drive forces transmitted from drive motors 40Y, 40M, 40C, and 40K, respectively. Each drive motor rotates the corresponding photosensitive drum in the counterclockwise direction in synchronization with the image forming operation. Note that components, such as the injection chargers 23Y, 23M, 23C, and 23K and the sleeves 23YS, 23MS, 23CS, and 23KS, constitute a charge unit.

Exposure

Then, the photosensitive drums 22Y, 22M, 22C, and 22K are irradiated with exposure light by scanner units 24Y, 24M, 24C, and 24K, respectively, to selectively expose the surfaces of the photosensitive drums, so that electrostatic latent images are formed on the surfaces. Note that components, such as the scanner units 24Y, 24M, 24C, and 24K, constitute an exposure unit.

Development

Subsequently, the electrostatic latent images are visualized by developers 26Y, 26M, 26C, and 26K. In other words, a single-color toner image is formed on each photosensitive drum. The developers 26Y, 26M, 26C, and 26K are provided with sleeves 26YS, 26MS, 26CS, and 26KS, respectively. Meanwhile, each developer can be detachably mounted. Components, such as the developers 26Y, 26M, 26C, and 26K and the sleeves 26YS, 26MS, 26CS, and 26KS, constitute a development unit.

Transfer

Then, the single-color toner images are transferred onto an intermediate transfer body 28 by rotating the intermediate transfer body 28 in the clockwise direction while also rotating the photosensitive drums 22Y, 22M, 22C, and 22K and first-transfer rollers 27Y, 27M, 27C, and 27K, positioned opposite the photosensitive drums 22Y, 22M, 22C, and 22K, respectively. Each single-color toner image can be efficiently transferred onto the intermediate transfer body 28 (first transfer) by applying an appropriate bias voltage to the corresponding first-transfer roller and making the rotational speed of the corresponding photosensitive drum and the rotational speed of the intermediate transfer body 28 differ from each other.

The yellow toner image formed on the photosensitive drum 22Y of the first station is transferred onto the intermediate transfer body 28 as the photosensitive drum 22Y is rotated. The yellow toner image transferred onto the intermediate transfer body 28 is conveyed as the peripheral surface of the intermediate transfer body 28 is moved. Moreover, in synchronization with the movement of the yellow toner image on the intermediate transfer body 28, the magenta, cyan, and black toner images formed at the second, third, and fourth stations are transferred and superimposed onto the yellow toner image from the photosensitive drums 22M, 22C, and 22K, respectively. As a result, a multi-color toner image of the four colors is formed on the surface of the intermediate transfer body 28. This multi-color toner image is conveyed to a second-transfer roller 29 by the rotation of the intermediate transfer body 28 while a printing medium 11 is nipped and conveyed from a sheet feed tray 21a or 21b to the second-transfer roller 29 to transfer the multi-color toner image on the intermediate transfer body 28 onto the printing medium 11. During this process, an appropriate bias voltage is applied to the second-transfer roller 29 to electrostatically transfer the toner image (second transfer). The second-transfer roller 29 is at the position indicated by reference numeral 29 to be in contact with the printing medium 11 while the multi-color toner image is transferred onto the printing medium, and moves away to the position indicated by reference numeral 29' after the process. Note that components, such as the photosensitive drums, the first-transfer rollers, and the intermediate transfer body 28, constitute a transfer unit.

Fixing

Then, the multi-color toner image transferred onto the printing medium 11 is fused and fixed onto the printing medium 11. To do so, a fixing roller 32 that heats the printing medium 11, and a pressure roller 33 that brings the printing medium 11 into pressure contact with the fixing roller 32 are provided. The fixing roller 32 and the pressure roller 33 are formed in hollow shapes and incorporate the heaters 34 and 35, respectively. Using the fixing roller 32 and the pressure roller 33, the fixing device 31 applies heat and pressure to the printing medium 11 holding the multi-color toner image while conveying the printing medium 11 to thereby fix the toners to the printing medium 11. The temperatures of the fixing roller 32 and the pressure roller 33 are controlled as follows. Temperature sensors (not illustrated) mounted to the rollers detect the temperatures on the rollers, and a later-described fixing-temperature control unit controls the heaters of the fixing device based on the detected temperatures and later-described fixing-temperature control information to thereby adjust the surface temperatures of the rollers. The fixing operation is performed in this state. The printing medium 11 with the toners fixed thereto is discharged onto a sheet discharge tray (not illustrated) by a sheet discharge roller (not illustrated).

A series of operations for forming an image ends as above.

After the end of the image forming operation, the toners remaining on the intermediate transfer body 28 are removed by a cleaning unit 30. The waste toners remaining after the transfer of the multi-color toner image formed on the intermediate transfer body 28 onto the printing medium 11 are stored in a cleaner container.

Configured of Image Forming Apparatus

Figure 3:
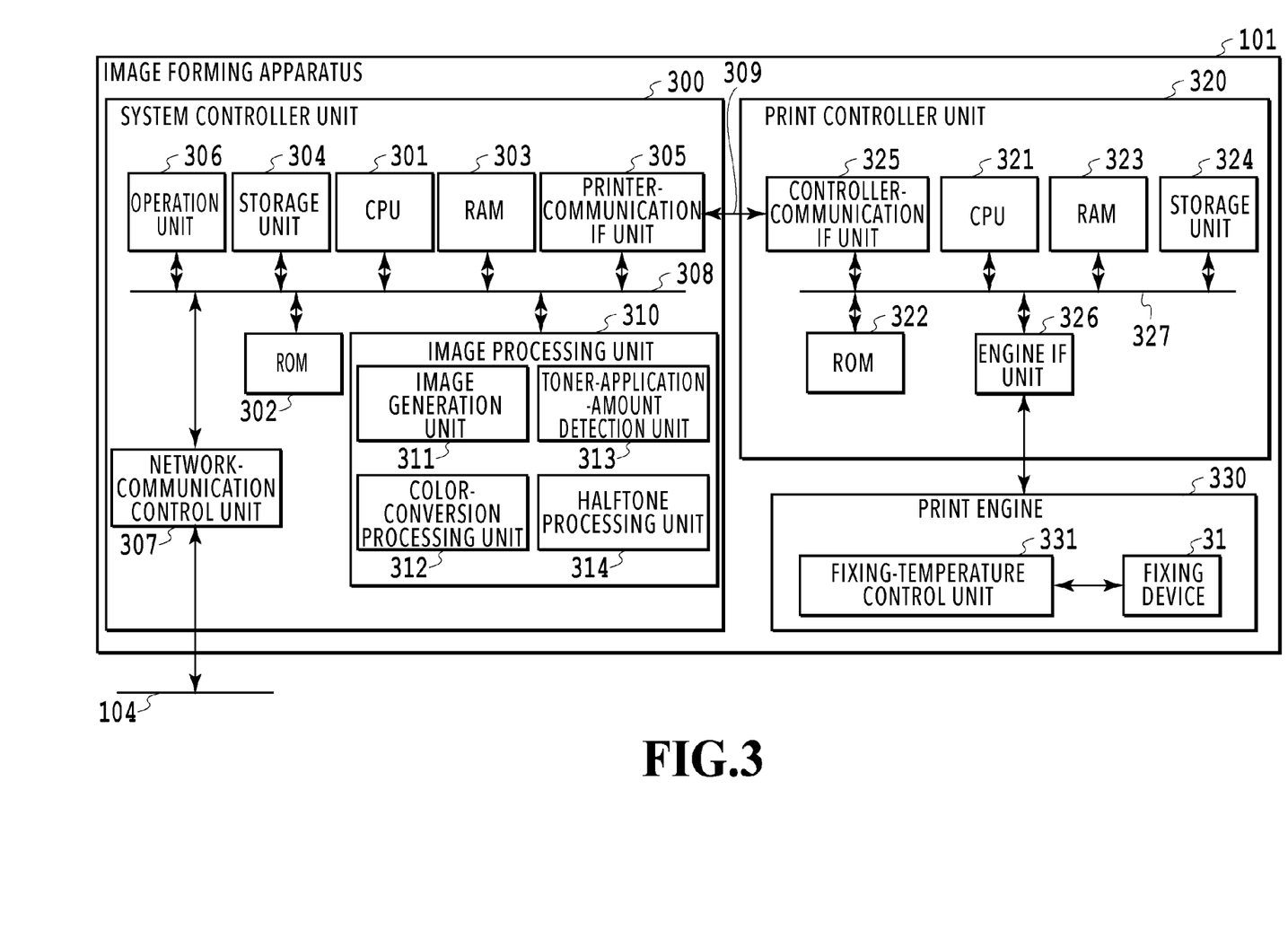
FIG. 3 is a block diagram of the image forming apparatus.

Next, functions associated with control for fixing temperature adjustment in the image forming apparatus 101 will be described with reference to FIG. 3. FIG. 3 is a block diagram of the image forming apparatus according to this embodiment.

As illustrated in FIG. 3, the image forming apparatus 101 includes a system controller unit 300, a print controller unit 320, and a print engine 330. Each controller unit includes a central processing unit (CPU) 301 or 321, a read only memory (ROM) 302 or 322, a random access memory (RAM) 303 or 323, and a storage unit 304 or 324. Moreover, these components are communicatively connected to each other by a corresponding bus 308 or 327. Each of the CPUs 301 and 321 reads a main program out of the corresponding ROM 302 or 322 by following an initial program in the corresponding ROM 302 or 322, and stores the main program in the corresponding RAM 303 or 323. The RAMs 303 and 323 are used main memories for storing programs and working.

The system controller unit 300 further includes a printer-communication interface (IF) unit 305, an operation unit 306, a network-communication control unit 307, and an image processing unit 310. Moreover, these units are communicatively connected to each other by the bus 308. The system controller unit (system control unit) 300 controls the entire system.

The image processing unit 310 includes an image generation unit 311, a color-conversion processing unit 312, a toner-application-amount detection unit 313, and a halftone processing unit 314. The image generation unit 311 generates raster image data containing red, green, and blue data (RGB data) color components from print data (print information) received from the client PC 103, or the like, and outputs RGB data on a pixel-by-pixel basis.

Note that the configuration may be such that the image forming apparatus 101 itself is provided with a read unit, and the image generation unit 311 handles image data read by this read unit instead of image data received from the client PC 103, or the like. Examples of the read unit here include a charge coupled device (CCD) or a contact image sensor (CIS). Also, the configuration may be such that a processing unit that performs predetermined image processing on read image data is additionally provided. Further, the configuration may be such that the image forming apparatus 101 is provided with no read unit, and receives image data from an external read unit through an interface, which is not illustrated.

The color-conversion processing unit 312 converts the RGB data generated by the image generation unit 311 into cyan, magenta, yellow, and black data (CMYK data) with toner-color. Specifically, the CMYK data converted by the color-conversion processing unit 312 contains data indicating the toner application amount of each of the colors C, M, Y, and K, and this toner application amount is expressed with 8 bits from 0 to 255 for each pixel. In a case in which the toner application amounts of all colors are 0, it indicates that no toner is used. As the toner application amount of a color increases, the density of that color increases. Moreover, in a case in which the toner application amount of a color reaches 255, it means that that color has its highest degree of density. A toner application amount of 255 means 100%, and the sum of the toner application amounts of all colors C, M, Y, and K represents the toner application amount of the pixel. For example, in a case in which the toner application amounts of two colors among C, M, Y, and K indicate 255, the sum of these toner application amounts is the toner application amount of the pixel and is presented as a value of 200%. Thus, the toner application amounts will be large in a case in which the image forming apparatus 101 prints image data fully using the toners of the four colors C, M, Y, and K in a full-color printing mode, whereas the toner application amounts will be small in a case in which the image forming apparatus 101 prints monochrome image data using only the color K.

The toner-application-amount detection unit 313 detects the toner application amounts in the CMYK data generated by the color-conversion processing unit 312. A specific method of detecting the toner application amounts will be described later. Also, the toner-application-amount detection unit 313 sends the CMYK data after the detection of the toner application amounts to the halftone processing unit 314.

The halftone processing unit 314 performs halftone processing on the data of each color output from the toner-application-amount detection unit 313. Specific configurations of the halftone processing unit 314 include one that uses screen processing and one that uses error diffusion processing. The screen processing is processing that uses a plurality of predetermined dither matrices and the input image data to perform N-value conversion. Also, the error diffusion processing is processing that involves performing a process of comparing a pixel of interest in input image data and a predetermined threshold with each other to convert the pixel of interest to one of N values, and diffusing the error between the pixel of interest and the threshold resulting from the N-value conversion to the neighboring pixels to be subsequently subjected to the N-value conversion.

The printer-communication IF unit 305 and a controller-communication IF unit 325 are interface (IF) units for performing communication between the system controller unit 300 and the print controller unit 320. The communication is performed through a communication cable 309. The information communicated here includes control signals from the system controller unit and information such as the toner-application-amount information detected by the toner-application-amount detection unit, the result of detection of a document not allowed to be photocopied, and image-combination setting information, as well as the image data to be printed.

The print controller unit 320 further includes an engine IF unit 326. The engine IF unit 326 is an interface (IF) unit for performing communication between the print controller unit 320 and the print engine 330. The information communicated here includes control signals from the system controller, and the like, and information such as the toner-application-amount information, as well as the image data to be printed.

The print engine 330 includes a fixing-temperature control unit 331 that controls the temperature of the fixing device 31. The fixing-temperature control unit 331 controls the temperature of the fixing device 31 based on target fixing-temperature control information determined by the toner-application-amount detection unit 313 of the system controller unit 300. This target fixing-temperature information is determined at a point preceding the page for which the printing operation (image formation) is to be performed by several pages. In this way, it is possible to continuously perform a page-by-page operation of fixing a multi-color toner image to a printing medium in a state in which the surface temperature of each roller of the fixing device is set to a target fixing temperature corresponding to the toner application amount. In other words, it is possible to smoothly perform a printing operation (image formation) with control on temperature adjustment. For example, with image data to be printed stored in the RAM 303, the target fixing-temperature information is determined at a point preceding the page for which the print engine is to perform a printing operation by three pages, and this information is sent to the print controller unit through the toner-application-amount detection unit (search window). Thereafter, the printing is performed by transmitting the image data to be printed to the print controller unit 320 with the printing timing of the print engine 330.

The print engine 330 receives the image data received from the controller-communication IF unit 325 through the engine IF unit 326 and forms the image data on a printing medium (sheet) by an electrophotographic process. The printing medium conveyed after this undergoes the heating process at the fixing device 31 to fix the toner image transferred onto the printing medium. During this process, the fixing device 31 fixes the toner image transferred to the printing medium while pressing it.

The operation unit 306 is a unit with which the user sets the operation mode of the image forming apparatus 101 and which displays status.

The network-communication control unit 307 is connected to the bus 308 and the network 104, such that each functional unit inside the image forming apparatus 101 can communicate with the network 104.

Fixing-Temperature Control Method

Figure 4A:
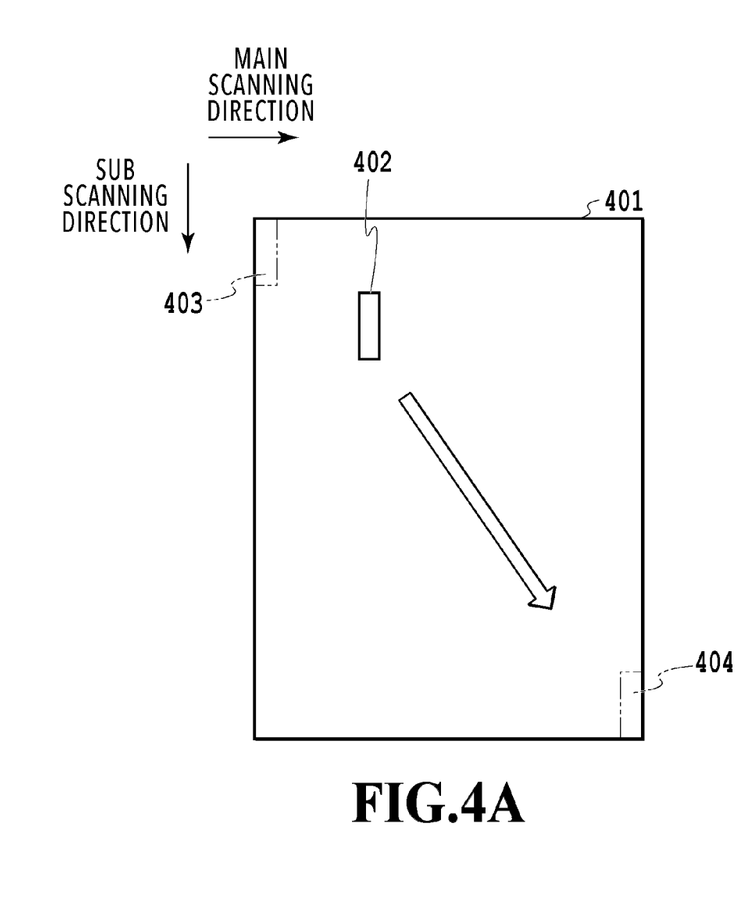
FIGS. 4A and 4B are diagrams explaining a method of obtaining fixing-temperature control information.
Figure 4B:
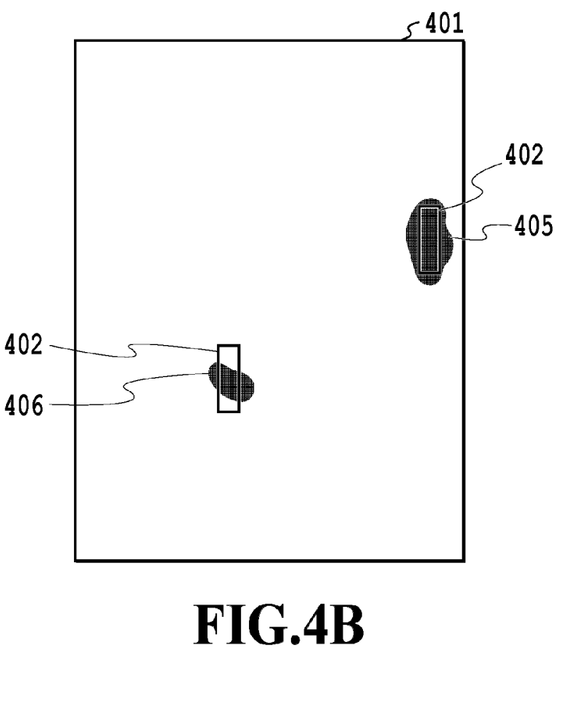

Next, a fixing-temperature control method will be described using FIGS. 4A and 4B. FIGS. 4A and 4B are diagrams illustrating a method of obtaining fixing-temperature-control-information applied to image data of each printing page.

FIG. 4A is a diagram explaining a procedure for obtaining fixing-temperature control information. As illustrated in FIG. 4A, image data 401 is data of a single page of printing medium with, for example, the size of A4 (210 mm×297 mm) to be printed by the image forming apparatus. A search window (search area) 402 is a window used in the fixing-temperature control method and is an area with which to search the image data 401 for a target to be obtained as fixing-temperature control information and to distinguish (determine) whether the searched area is a target to be obtained. For example, the search window 402 is an area measuring 5 mm in the main scanning direction (the rightward direction in FIG. 4A) and 56 mm in the sub scanning direction (the downward direction in FIG. 4A). In other words, the search window 402 is formed of a predetermined number of meshes among a plurality of meshes to be described later in detail. The search with the search window 402 starts from a search start position 403 at the top left end of the image data 401, is performed over the entire image data 401 in the main scanning direction and the sub scanning direction, and ends at a search end position 404 at the bottom right end of the image data 401. For example, a set of operations is repeated, which includes a search of the image data with the search window repetitively moved in the main scanning direction by a predetermined amount of movement from the left end to the right end, and movement of the search window in the sub scanning direction by the size of the search window in the sub scanning direction. In this way, the entire image data 401 is searched with the search window 402, and fixing-temperature control information can be obtained.

FIG. 4B is a diagram explaining the relations between the search window and image areas in a state of searching for fixing-temperature control information. Note that although the description will be given here by taking, as an example, a case in which the image data 401 is a black-and-white image, the search process can be performed also in a case in which the image data 401 is a color image, as is done in the case in which the image data 401 is a black-and-white image. In a case in which color printing is performed, the maximum toner application amount can be lowered to about 200% by, for example, performing a color reduction process at the image processing unit 310. In this way, it is possible to suppress the occurrence of poor fixing associated with the toner application amount. It is possible, however, to perform a search process for each color and then combine the results of the search processes of all colors.

As illustrated in FIG. 4B, an image area 405 present in the image data 401 is an image area with high color density having a toner application amount greater than or equal to a predetermined value, and also represents an area with a size greater than or equal to the size of the search window 402. When the search window 402 is located at the image area 405, it is determined whether or not the image area 405 is fixing-temperature control information to be obtained. As for this image area 405, it is determined that an image area having high color density and having a size greater than or equal to the size of the search window 402 is present. Note that the color density is determined based on whether or not a pixel value representing the color density is greater than a predetermined threshold.

Further, an image area 406 present in the image data 401 is an image area with high color density having a toner application amount greater than or equal to the predetermined value and also represents an area with a size smaller than the size of the search window 402. When the search window 402 is located at the image area 406, it is determined whether or not the image area 406 is fixing-temperature control information to be obtained. As for this image area 406, it is determined that only an area with a size smaller than the size of the search window 402 is present.

By scanning the entire image data of a single page from the search start position to the search end position with the search window as above, it is determined whether or not there is an image area like the image area 405 with a toner application amount greater than or equal to the predetermined value and a size greater than or equal to a predetermined size. Further, in a case in which it is determined that the color density condition and the size condition are both satisfied, that printing page will be fixed at a preset high temperature. Note that it is also possible to change the fixing temperature based on the position of the area with high color density, e.g. whether or not the position is close to either end in the main scanning direction, in addition to the determination of the toner application amount described above.

Figure 5:
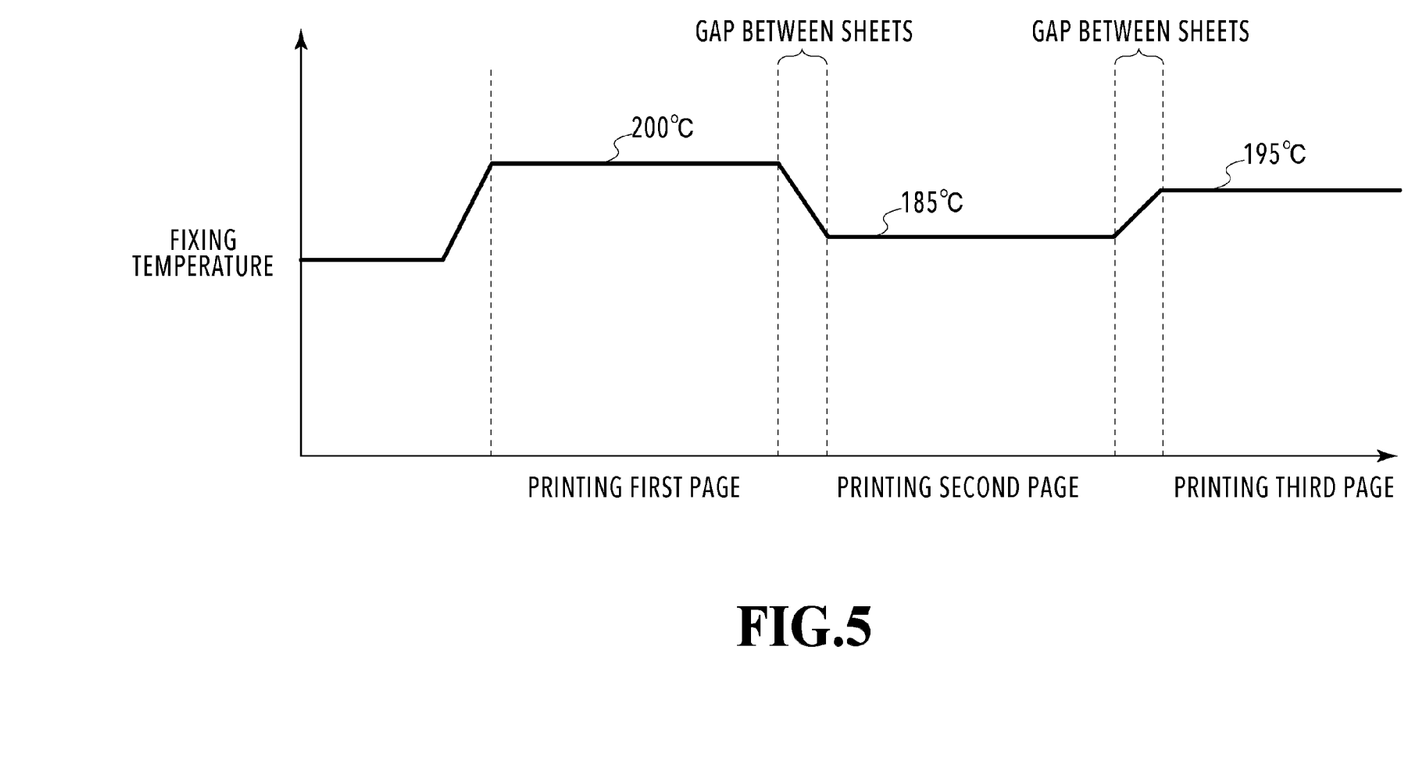
FIG. 5 is a diagram illustrating an example of change in fixing temperature.

Next, the relationship between the fixing temperature and printing pages set based on the obtained fixing-temperature control information will be described using FIG. 5. FIG. 5 is a diagram illustrating the fixing temperature for printing pages obtained as a result of performing the fixing temperature control for these pages. As illustrated in FIG. 5, the fixing temperature for the first page is set at 200° C. as a result of determining that an image area having high color density and having a size greater than or equal to the size of the search window 402 is present at a position close to either end of the printing medium (sheet) like the position of the image area 405 in FIG. 4B, for example. The fixing temperature for the second page is set at 185° C. as a result of determining that there is not any image area having high color density and having a size greater than or equal to the size of the search window 402. The fixing temperature for the third page is set at 195° C. as a result of determining that an image area having high color density and having a size greater than or equal to the size of the search window 402 is present at a position other than either end of the printing medium (sheet).

The fixing temperature control is performed as above. Note that in a case in which the fixing temperature varies from one page to another, the fixing temperature is changed at the gap between the sheets.

Here, in a case in which the above analysis process using the search window 402 is performed only with software (S/W), the amount of processing for the analysis may possibly be so large that the CPU cannot obtain the result of the analysis process within the expected time, depending on the processing capacity of the CPU. Specifically, the processing capacity of the CPU may possibly be exceeded such that the processing for a page cannot be completed within the required time set per page. Also, one may consider thinning the pixels to be referred to, or a similar approach, to make the analysis process lighter, but doing so will lower the analysis accuracy.

On the other hand, in a case in which the above analysis process using the search window 402 is performed only with hardware (H/W), the circuit scale of a buffer memory that temporarily stores the image data may possibly be so large that it will be difficult to house the buffer memory inside the apparatus of the desired size, depending on the size of the search window.

An analysis method for fixing temperature control according to this embodiment will be described with the above circumstances taken into consideration.

Analysis Method for Fixing Temperature Control with H/W

Figure 6A:
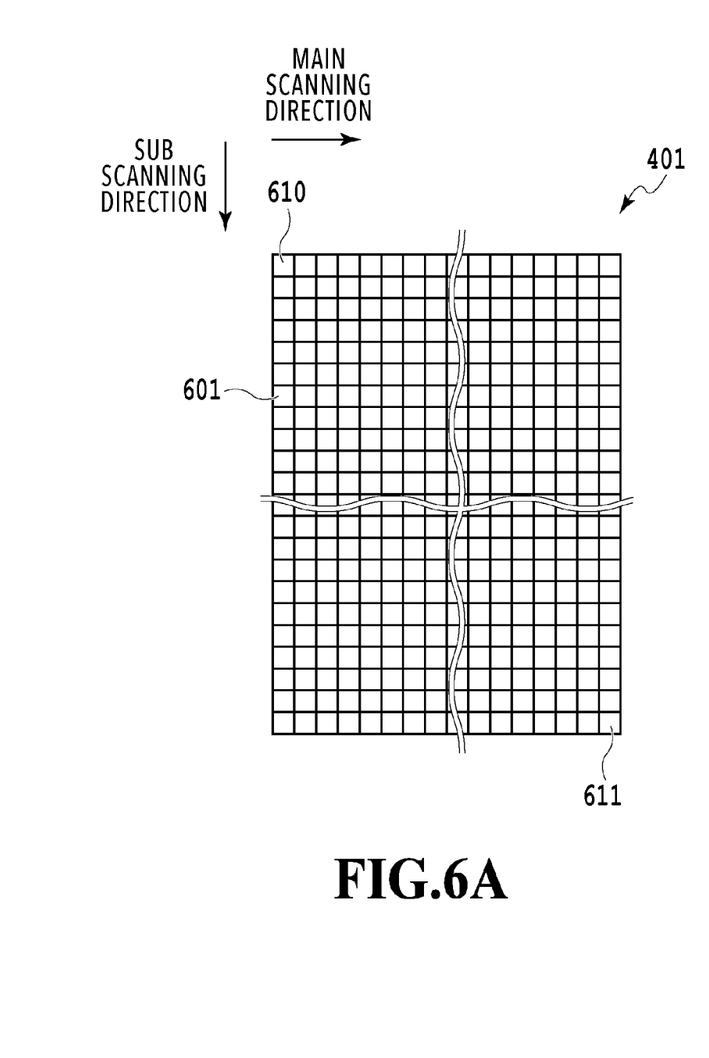
FIGS. 6A and 6B are diagrams illustrating a state where image data is divided into meshes.
Figure 6B:
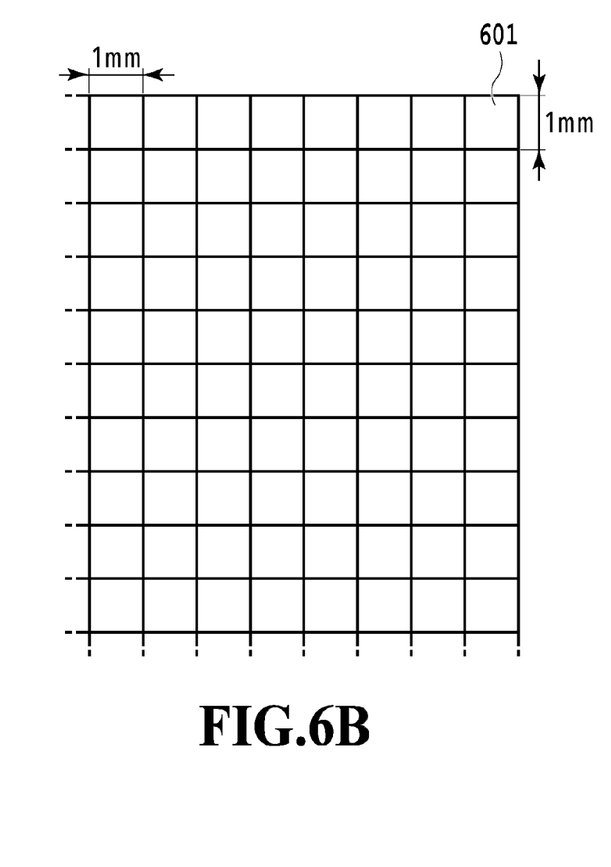

Next, the analysis method for fixing temperature control according to this embodiment will be described. This analysis method for fixing temperature control is performed within the toner-application-amount detection unit 313, provided in the image processing unit 310 of the system controller unit 300. FIGS. 6A and 6B are diagrams illustrating a state in which the entire area of the image data 401 of a single page to be printed is divided into small areas of a predetermined size (hereafter, these small areas will be referred to as "meshes"). FIG. 6A is a diagram illustrating the entirety of the image data thus divided, while FIG. 6B is an enlarged view of a given portion of the image data. Also, in FIG. 6A, a mesh 610 located at the top left in the figure will be referred to as the first mesh, while a mesh 611 located at the bottom right in the figure will be referred to as the last mesh. Here, for the sake of description, the meshes are assumed to be processed in an order in which the processing starts from the first mesh 610 in the main scanning direction and, once reaching the right end, continues to the mesh directly below the first mesh 610, and subsequently repeats this pattern until reaching the last mesh.

As illustrated in FIG. 6B, the size of each mesh 601 is 1 mm square, for example. In a case in which the image data 401 to be printed is the A4 size, it is divided into 210 pieces in the main scanning direction and 297 pieces in the sub scanning direction, so that the total number of meshes is 62370. That is, the total number of meshes in the image data 401 is 62370.

This process of dividing the image data 401 into the meshes 601 is performed for the purpose of counting the toner application amounts of the pixels in each mesh. Hereafter, the process of dividing the image data into the meshes 601 will be referred to as mesh division. Similarly, the process of counting the toner application amounts of the pixels in each mesh will be referred to as mesh counting. The mesh division and the mesh counting are performed by the toner-application-amount detection unit 313. For each pixel of the CMYK data sent to the toner-application-amount detection unit 313, it is determined in which mesh area the pixel is present, and its toner application amount is counted under the corresponding mesh.

Figure 7A:
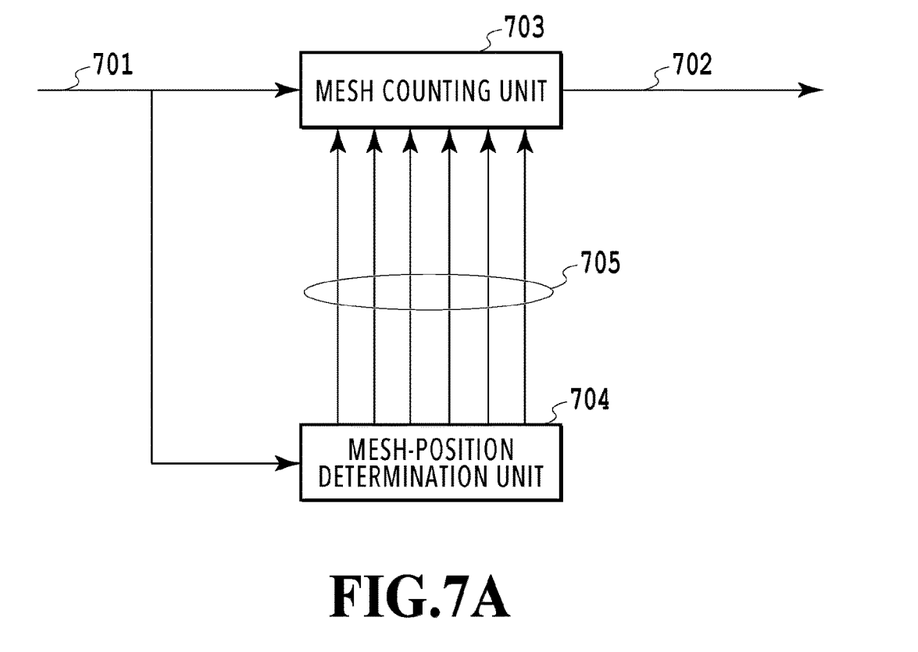
FIGS. 7A, 7B, and 7C are diagrams explaining a method for a mesh counting process.
Figure 7B:
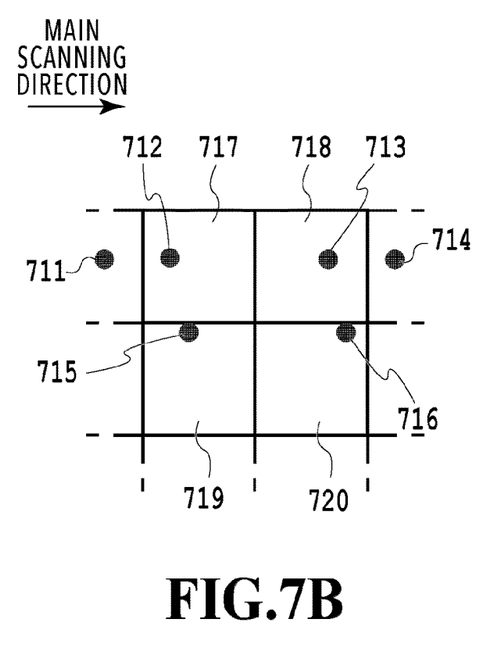
Figure 7C:
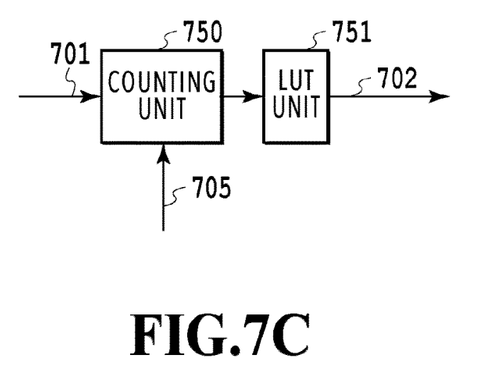

The mesh counting by the toner-application-amount detection unit 313 will now be described using FIGS. 7A, 7B, and 7C. FIG. 7A is a diagram explaining a configuration that performs the mesh counting process. Note that the mesh counting process is performed on the CMYK data individually for each color, and result data is generated for each color. The count data of the toner application amounts of each mesh thus generated will be referred to as mesh data. Although FIGS. 7A, 7B, and 7C illustrate a configuration performing the mesh counting process for one color in the CMYK data, there are actually four of these configurations and they perform the mesh counting process in parallel for their respective colors. FIGS. 7A, 7B, and 7C explain the mesh counting process only for one color, however, for simple explanation. As illustrated in FIG. 7A, the toner-application-amount detection unit 313 includes a mesh counting unit 703 and a mesh-position determination unit 704. The output side of an image-data transfer IF unit 701 is connected to the input sides of the mesh counting unit 703 and the mesh-position determination unit 704. The input side of a mesh-data transfer IF unit 702 is connected to the output side of the mesh counting unit 703. The input sides of mesh-position determination signals 705 provided for preset meshes are connected to the output side of the mesh-position determination unit 704. The output sides of the mesh-position determination signals 705 are connected to the mesh counting unit 703. Specifically, as many mesh-position determination signals 705 as the maximum number of mesh positions the mesh-position determination unit 704 can determine are provided in advance. Note that in a case in which the mesh division is performed using a number that is less than the above maximum number, only some of all mesh-position determination signals will be used.

The image data is input into the mesh counting unit 703 and the mesh-position determination unit 704 through the image-data transfer IF unit 701. The input image data is input in raster order. Here, it is determined for each pixel of the image data in which mesh among the plurality of divided meshes the pixel is located.

A mesh-position determination method will be described with reference to FIG. 7B. FIG. 7B is a diagram for explaining the mesh-position determination method. As illustrated in FIG. 7B, in a case in which the pixel is present, for example, at a position 711 or a position 714, the pixel is not present in any of the areas of a mesh 717, a mesh 718, a mesh 719, and a mesh 720. On the other hand, in a case in which the pixel is present at a position 712, the pixel is present in the area of the mesh 717, and, in a case in which the pixel is present at a position 713, the pixel is present in the mesh 718. Similarly, in a case in which the pixel is present at a position 715, the pixel is present in the area of the mesh 719, and, in a case in which the pixel is present at a position 716, the pixel is present in the area of the mesh 720. The result of the determination on in which mesh a pixel is present based on the position of the pixel in the image data is output as a mesh-position determination signal 705 from the mesh-position determination unit 704. Note that the number of meshes is 62370, as mentioned above, and the number of mesh-position determination signals 705 is, therefore, 62370, as well. Note that since the image data is input pixel by pixel, only one of the 62370 mesh-position determination signals 705 shows a valid value and the other signals are disabled. Also, while the number of meshes is 62370 in a case in which the size of each mesh 601 is 1 mm square, as mentioned above, the number of meshes is greater in a case in which the size is less than 1 mm square. For this reason, as many mesh-position determination processes and mesh-position determination signals 705 as needed are prepared.

The mesh counting unit 703 counts the toner application amounts of the pixels of interest from the image data and the corresponding mesh-position determination signal 705 with a counter unit (not illustrated). For example, for the mesh 717, the corresponding mesh-position determination signal 705 is enabled, so that the counter unit for the mesh 717 counts the values of the toner application amounts of the pixels located in the mesh 717. Since the pixels are input in raster order, the toner application amounts of the pixels added together continuously in the main scanning direction.

On the other hand, after a specific pixel, it is possible to detect that the pixels are located in the next mesh 718 from their mesh-position determination signals 705. In this case, the counter unit for the mesh 718 counts the toner application amounts of those pixels. Also, as the image data is input, the mesh counting is performed in other meshes such as the mesh 719 and the mesh 720.

Note that although the size of each mesh is 1 mm square for simple description, each of mesh may be of any size suitable for the target to be detected, or the like. Also, although each mesh is illustrated in a square shape in FIGS. 8A, 8B, and 8C, it may be in a rectangular shape.

The mesh data thus created is output from the mesh counting unit 703 through the mesh-data transfer IF unit 702 for transferring mesh data. The mesh data is transferred through this mesh-data transfer IF unit 702 to the RAM 303.

The count value of each mesh will now be described. The size of each mesh 601 is 1 mm square. Then, assuming, for example, that the resolution of the image data is 600 dots per inch (dpi), 1 mm is equivalent to approximately 24 pixels. Thus, the number of pixels included in each mesh is about 576. On the other hand, the image data input into the mesh counting unit 703 is 8-bit data. Then, the count value can be 146880 at most by simply counting up all toner application amounts. In a case in which such a count value is handled as is, it will be troublesome to handle such count values of all meshes. For this reason, the mesh counting unit 703 applies a normalization process to each count value to reduce the amount of data. Here, the normalization refers to reducing the number of bits of the count value by using a lookup table (LUT) unit. FIG. 7C is a diagram for explaining the normalization process. As illustrated in FIG. 7C, the mesh counting unit 703 includes a counting unit 750 and a LUT unit 751. The counting unit 750 counts the image data input thereto in response to each mesh-position determination signal 705. The LUT unit 751 is a unit configured to perform a bit conversion for reducing the number of bits of the mesh data counted by the counting unit 750. This normalization process reduces the data amount of the mesh data.

Analysis Method for Fixing Temperature Control with S/W

Figure 8A:
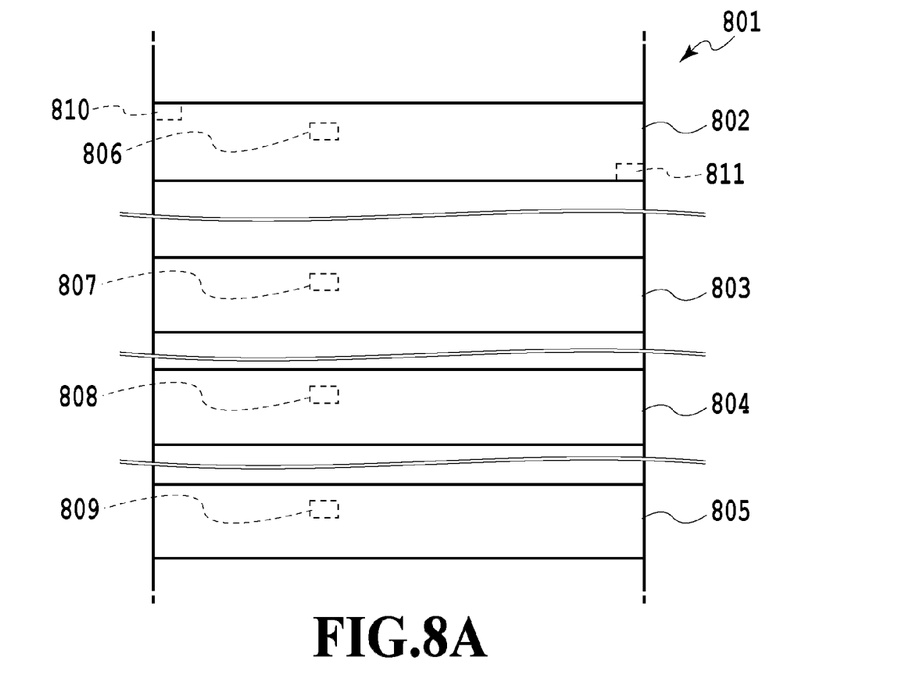
FIGS. 8A, 8B, and 8C are diagrams explaining a mesh-data analysis method.

Next, a method of analyzing the pieces of mesh data transferred to and stored in the RAM 303 with S/W will be described. FIG. 8A is a diagram illustrating the state of the pieces of mesh data stored in the RAM 303. As illustrated in FIG. 8A, a memory space 801 in the RAM 303 is a space prepared in a different area from the space for expanding the above-mentioned software program and storing image data, and is a space for storing the pieces of mesh data. Reference numeral 802 denotes a collection of 62370 pieces of mesh data obtained by sequentially storing the pieces of C-color mesh data created by the method described with reference to FIGS. 7A, 7B, and 7C, and the pieces of mesh data in this state will be referred to as mesh map data. Reference numeral 802 denotes C-color mesh map data. Similarly, reference numeral 803 denotes M-color mesh map data, reference numeral 804 denotes Y-color mesh map data, and reference numeral 805 denotes K-color mesh map data. Thus, the pieces of mesh data created by the toner-application-amount detection unit 313 are stored in different memory spaces based on their colors.

Figure 8B:
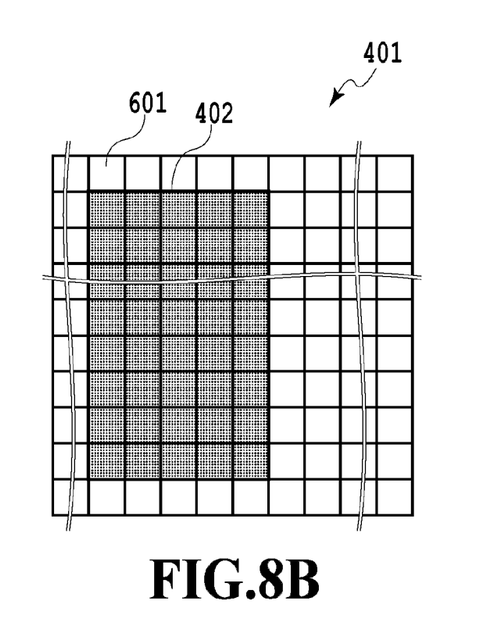
Figure 8C:
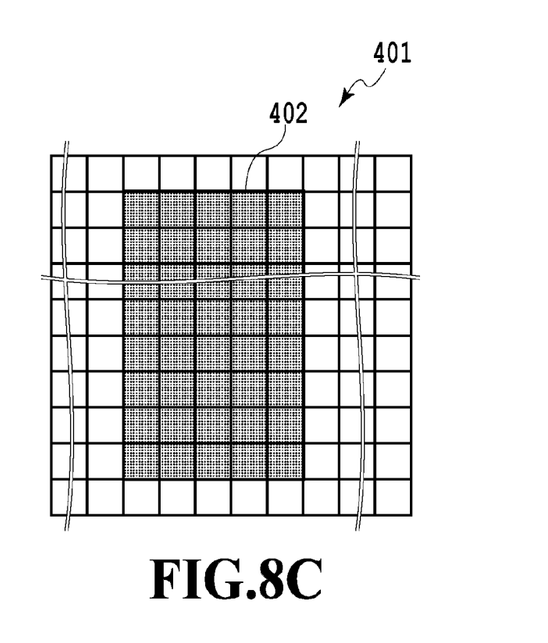

Next, the internal configuration of the C-color mesh map data with reference numeral 802 to the K-color mesh map data with reference numeral 805 will be described. A piece of mesh data denoted by reference numeral 810 corresponds to a piece of mesh data at the first mesh 610, described with reference to FIG. 6A. Similarly, a piece of mesh data denoted by reference numeral 811 corresponds to a piece of mesh data at the last mesh 611, described with reference to FIG. 6A. Thus, the mesh map data is stored in the order of the meshes from the first mesh 610 to the last mesh 611. Here, reference numeral 806 denotes a piece of mesh data at a mesh at a given position in the C-color mesh map data 802. Also, pieces of mesh data at the same mesh position in the M-color mesh map data 803, the Y-color mesh map data 804, and the K-color mesh map data 805 are denoted by reference numeral 807, reference numeral 808, and reference numeral 809, respectively. In this way, even after the mesh map data is stored in the memory space 801, pieces of C-, M-, Y-, and K-color mesh data at the same mesh position can be handled with S/W. For example, FIG. 8B is a diagram illustrating the relationship between the image data 401 after the mesh division and the search window 402. FIG. 8C is a diagram illustrating a state after the search window 402 illustrated in FIG. 8B is scanned by one mesh in a lateral direction in the figure.

The size of each mesh 601 is 1 mm square, and the size of the search window 402 is 5 mm×56 mm. Thus, the search window 402 is an area with a combination of 5 meshes 601 in the main scanning direction by 56 meshes 601 in the sub scanning direction. In a case in which the search window 402 is scanned, it is scanned mesh by mesh. Since any pieces of mesh data in the mesh map data, stored in the RAM 303, can be handled with S/W as described above, the process of scanning the search window 402 can be achieved by continuously performing an operation of reading out pieces of mesh data as described above. By scanning the search window within the image data 401 as described above, it is possible to implement an analysis for fixing temperature control with the mesh division described in this embodiment.

Flowchart

Figure 9:
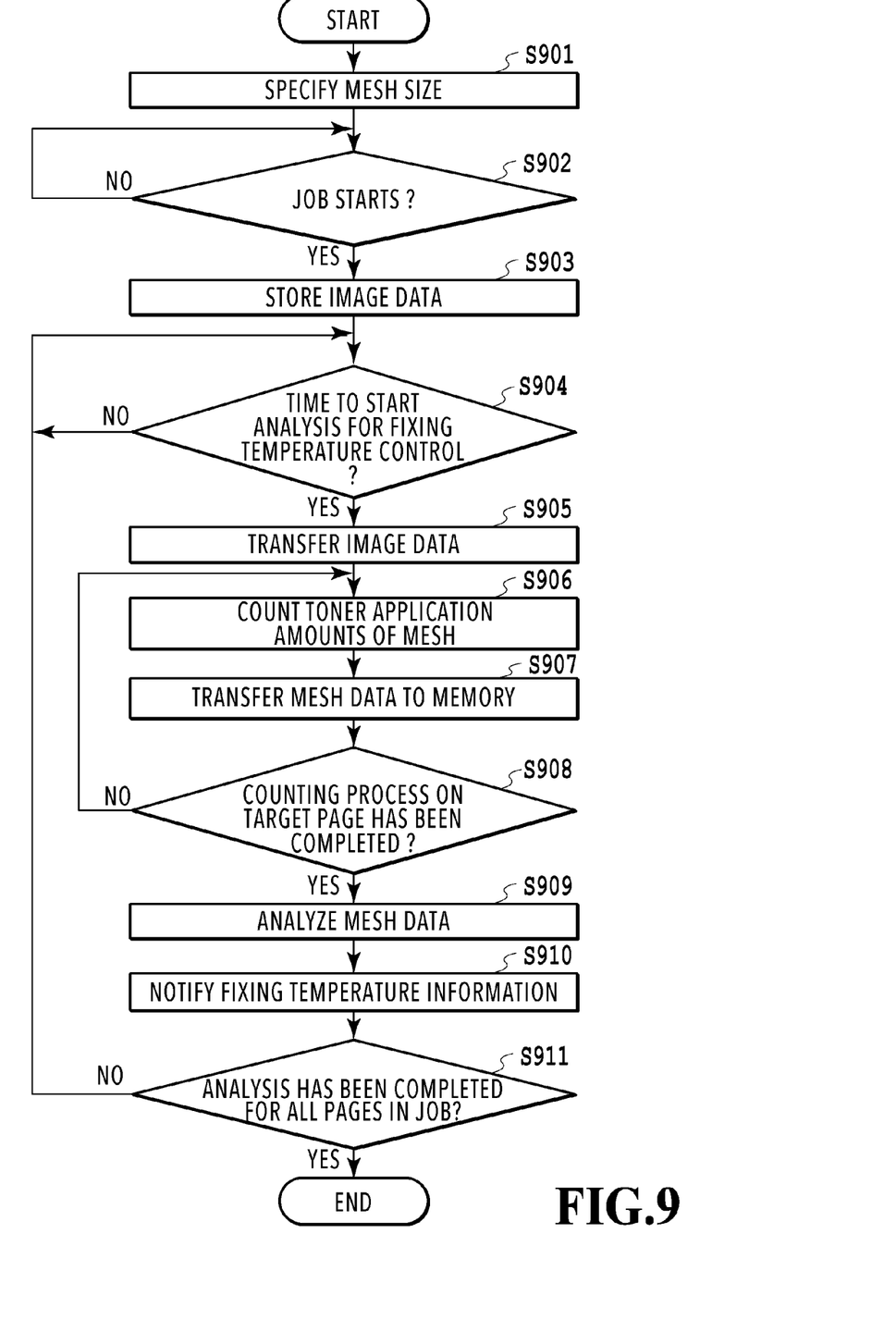
FIG. 9 is a flowchart illustrating the flow of a fixing-temperature analysis process.

The analysis method for fixing temperature control according to this embodiment will be described using a flowchart in FIG. 9. Note that the flowchart is assumed to be implemented by expanding a control program stored in the ROM 302 into the RAM 303 and executing it with the CPU 301, unless otherwise noted. For the printing process of a predetermined number of pages of printing media to be printed first, it is also possible to control the fixing device to a preset high temperature, e.g., 200° C., in accordance with the time to be taken for the fixing-temperature control process. The symbol S as used herein refers to a step in the flowchart.

In step S901, a specified mesh size is received, and the size of the mesh division to be used for the analysis for fixing temperature control is determined. Note that as for the method of specifying the mesh size, the mesh size may be input by the user through the operation unit 306 or the mesh size may be specified in response to a print request from the client PC 103. The mesh division size information thus determined is set in a setting unit (not illustrated) of the mesh-position determination unit 704 and is reflected in the generation of the mesh-position determination signals 705. In other words, the meshes are associated with the mesh-position determination signals 705. Thus, in a case in which pixels are determined to be present in the mesh at a given position, such information will be notified to the mesh counting unit 703 by means of the mesh-position determination signal 705 corresponding to this mesh.

Then in step S902, it is determined whether or not a print-job start instruction has been received from the client PC 103, or the like. In a case in which a print-job start instruction has been received, the flow proceeds to step S903. Note that the state of waiting for a print-job start instruction will be maintained until it is determined that a print-job start instruction has been received.

In step S903, the print job starts, and the image data received along with the print job is subjected to various types of image processing by the image processing unit 310 and stored temporarily in the RAM 303. It is after temporarily storing the image data in the RAM 303 that the process by the toner-application-amount detection unit 313 is performed. Thus, the process by the toner-application-amount detection unit 313 is not performed in step S903. Meanwhile, the storage unit 304 will be used in place of the RAM 303 in a case in which image data of a predetermined number of pages or more is to be temporarily stored.

Then in step S904, it is determined whether or not it is time to perform the analysis for fixing temperature control. This determination is made based on whether or not the difference in number of pages between the page for which the analysis for fixing temperature control is to be performed and the page currently in the printing process has reached a predetermined number of pages, as mentioned above. This process certainly secures the time needed for the analysis for fixing temperature control. In a case in which it is determined that it is time to start the analysis, the flow proceeds to step S905. Note that the state of waiting for time to start the analysis will be maintained until it is determined that it is time to start the analysis.

Then, in step S905, the image data of the page for which the analysis for fixing temperature control is to be performed is transferred to the mesh counting unit 703 and the mesh-position determination unit 704 in the toner-application-amount detection unit 313 through the image-data transfer IF unit 701. In step S905, transferred is the piece of image data of the target page in the image data temporarily stored in step S903.

Then, in step S906, the mesh counting unit 703 performs the toner-application-amount counting process on a mesh by using the image data and the corresponding mesh-position determination signal 705 to thereby create a piece of mesh data.

Then, in step S907, the mesh counting unit 703 transfers the piece of mesh data thus created to the RAM 303 through the mesh-data transfer IF unit 702 and the bus 308.

Then, in step S908, it is determined whether or not the creation of the mesh map data of the target page has been completed. In a case in which the creation of the mesh map data is determined be completed, the flow proceeds to step S909. On the other hand, in a case in which the creation of the mesh map data is not determined to be completed, the flow returns to step S906, and the processes from steps S906 to S908 will be performed again.

Then, in step S909, the mesh map data transferred to the RAM 303 is analyzed. The analysis in step S909 is performed by scanning the search window 402 over the entire data, as described with reference to FIGS. 8B and 8C. Consequently, an analysis result is obtained.

Then, in step S910, the fixing-temperature control information on each printing page determined as described with reference to FIG. 5 is notified to the print controller unit 320.

Then, in step S911, it is determined whether or not the analysis has been completed for all pages in the print job. In a case in which the analysis has not been completed for all pages, the flow returns to step S904, and the processes from steps S904 to S911 will be performed again. In a case in which the analysis has been completed for all pages, the flow is terminated.

The analysis method for fixing temperature control according to this embodiment can be implemented as above. Specifically, for each printing page, the entire area of its image data is divided into meshes of a predetermined size and the toner application amounts are counted on a per mesh basis. In this way, it is possible to refer to the toner application amounts of all pixels while reducing the amount of information necessary for the analysis process for fixing temperature control. Also, the reduction in amount of information can shorten the time taken for the analysis process, and thus, enables the analysis process to be completed within a predetermined time. It is, therefore, possible to prevent the decrease in print rate due to the time taken for the analysis process and the occurrence of poor fixing of the toner image.

Thus, it is possible to implement an analysis for fixing temperature control without lowering its accuracy. The fixing temperature can, therefore, be properly controlled for each printing page by efficiently analyzing the image data.

Also, the above information is created by analyzing, with the search area, formed of a predetermined number of meshes among the plurality of meshes, the toner application amounts of the pixels corresponding to the search area in each of the printing pages of the image data. In this way, it is possible to further reduce the amount of information necessary for the analysis process for fixing temperature control.

Further, pieces of mesh data are created by performing the mesh division and the mesh counting with H/W. The pieces of mesh data thus created are sequentially stored into the RAM 303 to thereby form mesh map data. By reading out the pieces of mesh data as desired and analyzing them with S/W, fixing-temperature control information can be obtained. With H/W and S/W serving different roles in the analysis method for fixing temperature control, it is possible to further shorten the time taken for the analysis process.

A case in which the fixing-temperature control method is applied to a print job has been described in this embodiment. Note, however, that the fixing-temperature control method is also applicable to a copy job, which involves reading a document with a scanner and printing the read data.

Other Embodiments

The above embodiment has been described by taking as an example the image forming apparatus 101, including development stations for the four colors of C, M, Y, and K. Specifically, the above embodiment has been described by taking, as an example, an image forming apparatus including four photosensitive drums and scanner units respectively for the photosensitive drums. The present invention is not limited, however, to this example. The image forming apparatus may include development stations for more than or less than four colors, or include a development station for a single color.

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the above embodiment, it is possible to properly control the fixing temperature for each printing page by efficiently analyzing the image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   (A) a transfer unit that transfers a toner image to a printing medium, the toner image having been formed based on image data;
   (B) a fixing unit that fixes the transferred toner image to the printing medium, in a fixing operation;
   (C) a memory device that stores a set of instructions; and
   (D) at least one processor that executes the set of instructions to function as:
      (a) a derivation unit that derives, for each of a plurality of blocks of the image data, a value indicating a toner amount to be used in forming the toner image by referring to a density of every pixel of a plurality of pixels in both a vertical direction and a horizontal direction, included in each block of the image data;
      (b) a shifting unit that shifts a window, having a length of a plurality of blocks in a vertical direction and a length of a plurality of blocks in a horizontal direction, wherein the window being shifted and the window after being shifted overlap with each other; and
      (c) a determination unit that determines a fixing temperature for the fixing operation based on (i) an analysis result of a first toner amount in the window before being shifted by referring to the toner amount of each block included in the window before being shifted, and (ii) an analysis result of a second toner amount in the window after being shifted by referring to the toner amount of each block included in the window after being shifted.

2. The image forming apparatus according to claim 1, wherein the value indicating the toner amount is created by analyzing, for a search area, the density of the pixels corresponding to the search area in each of printing pages of the image data, the search area being formed of a predetermined number of blocks, among the plurality of blocks.

3. The image forming apparatus according to claim 1, wherein the at least one processor further functions as (d) a counting unit that counts toner amounts of the image data, and outputs count data, and
wherein the determination unit further converts the count data of the toner amounts using a lookup table.

4. The image forming apparatus according to claim 1, wherein the determination unit is implemented by a system control unit that controls an entire system.

5. The image forming apparatus according to claim 1, wherein the determination unit is configured with hardware, and the value indicating the toner amount is created with software.

6. An image forming method comprising:
   transferring a toner image to a printing medium, the toner image having been formed based on image data;
   fixing the toner image to the printing medium at a fixing temperature, in a fixing operation;
   deriving, for each of a plurality of blocks of the image data, a value indicating a toner amount to be used in forming the toner image by referring to a density of every pixel of a plurality of pixels in both a vertical direction and a horizontal direction, included in each block of the image data;
   shifting a window, having a length of a plurality of blocks in a vertical direction and a length of a plurality of blocks in a horizontal direction, wherein the window before being shifted and the window after being shifted overlap with each other; and
   determining the fixing temperature for the fixing operation based on (i) an analysis result of a first toner amount in the window before being shifted by referring to the toner amount of each block included in the window before being shifted , and (ii) an analysis result of a second toner amount in the window after being shifted by referring to the toner amount of each block included in the window after being shifted.

7. A non-transitory computer readable storage medium storing a program for causing a computer to execute an image forming method in an image forming apparatus, the method comprising:
   transferring a toner image to a printing medium, the toner image having been formed based on image data;
   fixing the toner image to the printing medium at a fixing temperature, in a fixing operation;
   deriving, for each of a plurality of blocks of the image data, a value indicating a toner amount to be used in forming the toner image by referring to a density of every pixel of a plurality of pixels in both a vertical direction and a horizontal direction, included in each block of the image data;

shifting a window, having a length of a plurality of blocks in a vertical direction and a length of a plurality of blocks in a horizontal direction, wherein the window before being shifted and the window after being shifted overlap with each other; and determining the fixing temperature for the fixing operation based on (i) an analysis result of a first toner amount in the window before being shifted by referring to the toner amount of each block included in the window before being shifted, and (ii) an analysis result of a second toner amount in the window after being shifted by referring to the toner amount of each block included in the window after being shifted.

8. The image forming apparatus according to claim 1, wherein the derivation unit derives the value indicating the toner amount by referring to the density of all pixels included in the plurality of blocks of the image data.

* * * * *